United States Patent Office 3,594,224
Patented July 20, 1971

3,594,224
CELLULOSIC FIBERS IMPREGNATED WITH A QUATERNARY SALT OF A TERTIARY AMINE
Peter Blackman, Cranston, R.I., assignor to I.C.I/Organics/Inc.
No Drawing. Division of application Ser. No. 577,774, Sept. 7, 1966, now Patent No. 3,492,324, which is a continuation of application Ser. No. 276,069, Apr. 26, 1963. This application July 25, 1969, Ser. No. 855,442
Int. Cl. D06m 13/40
U.S. Cl. 117—139.5
11 Claims

ABSTRACT OF THE DISCLOSURE

A cellulosic fiber impregnated with a compound having the formula

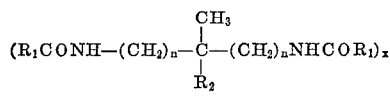

wherein $R_1CO$ is a fatty acid radical, $R_2$ is selected from the group consisting of hydrogen, alkyl, hydroxy alkylene, alkaryl and aryl, $x$ is a radical selected from the group consisting of sulfate, halide and aliphatic acid radicals and $n$ is 2–6. Methods of impregnating cellosic fibers with the indicated compounds and methods of preparing these compounds are also disclosed.

This application is a division of my copending application, Ser. No. 577,774, filed Sept. 7, 1966, as a continuation of Ser. No. 276,069, filed Apr. 26, 1963, the last mentioned application now being abandoned. Said Ser. No. 577,774 has now issued as U.S. Pat. 3,492,324.

This invention relates to new and novel compositions of matter and to methods for producing them and particularly to acid and quaternary salts of tertiary amines having the formula

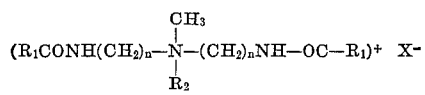

wherein $R_1CO$ represents a fatty acid radical derived from a fatty acid containing, preferably, at least 8 or more carbon atoms; $R_2$ represents hydrogen, an alkyl radical, preferably a lower alkyl, a hydroxyalkylene such as polyalkylene glycol, an alkaryl radical such as dodecylbenzyl or an aryl radical such as phenyl; X represents a radical which may be a sulfate, preferably a lower alkyl sulfate such as methosulfate or ethosulfate, a halide, preferably chloride or an aliphatic acid radical, preferably a lower alkyl monocarboxylic acid radical and $n$ is 2 to 6.

The acid and quaternary salts of tertiary amines of this invention may be applied to cellulosic fibers, such as paper or cotton fabrics or any other textile material and when so applied impart thereto excellent softness, drape and pliability of the material. These advantages are also imparted to a fabric treated with the products of this invention in combination with a resin. The acid and quaternary salts of tertiary amines of this invention may be prepared in a simple three stage reaction wherein the first stage a readily available fatty acid is reacted with a dialkylene triamine having the formula

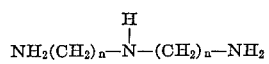

wherein $n$ is 2 to 6 to produce an amide condensate having the formula

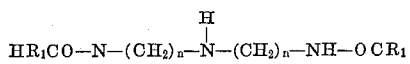

wherein $R_1CO$ and $n$ have the same meaning as above. This first stage reaction is generally carried out at ambient pressure conditions and at a temperature of about 140° C. to 190° C. This amide condensate is then reacted in a second stage reaction with formic acid and formaldehyde at a temperature of about 90–130 C. to form a tertiary amine having the formula

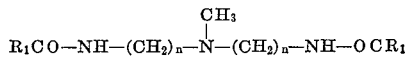

wherein $R_1$ and $n$ have the same meaning above. Subsequently in a third stage reaction this tertiary amine is reacted with a compound having the formula $R_2X$ wherein $R_2$ may represent hydrogen, alkyl, hydroxy-alkylene, alkaryl or aryl and X may represent sulfate, halide or and aliphatic acid radicals. This reaction generally is conducted at ambient pressures and at a temperature of about 110° C. to 130° C. for a time sufficient to produce the novel products of this invention which generally will be about 1 to 2 hours or more.

Suitable fatty acids employed in the first stage reaction may be any fatty acid or mixture of fatty acids, saturated or unsaturated, having at least about 8 carbon atoms, preferably up to about 18 carbon atoms, e.g. caprylic, pelargonic, capric, undecylic, lauric, tridecanoic, myristic, pentadecanoic, palmitic, margaric, stearic, linoleic, oleic, linolinic etc. Mixed acids resulting from the splitting of the glycerides of commonly available fats and oils such as tall oil may also be employed. Examples of suitable alkylene polyamines having the formula

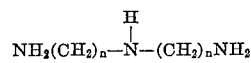

where $n$ is 2 to 6 are diethylene triamine and bishexamethylene triamine.

Suitable compounds having the formula $R_2X$ which may be employed in the third stage reaction to produce the novel compositions of this invention by a reaction with the product of the second stage reaction, i.e. a tertiary amine, are, for instance, alkyl sulfates, such as dimethyl and diethyl sulfate, alkaryl and hydroxyalkylene and phenyl chlorides such as polyethylene glycol chloride, dodecylbenzyl chloride or benzylchloride, and aliphatic acids, preferably lower alkyl monocarboxylic acids such as acetic, isobutyric, etc.

The novel products of this invention may conveniently be admixed with an aqueous medium in amounts sufficient to form a smooth even paste and in such a form the product of this invention will generally be present in amounts of about 15–50 weight percent and advantageously about 25 weight percent. In such a paste form the products of this invention are conveniently shipped or stored. Fluid dispersions of these pastes may also be effected by the addition of water in amounts sufficient to produce a dispersion containing about 2 to 6 weight percent of the novel product. Such fluid dispersions are effectively incorporated into textiles and paper. The amount, of course, will depend on the purpose to be served and any amount will effectively impart to an impregnated material excellent softness and pliability although for economic considerations usually not more than 1 or 2 parts by weight of such a fluid dispersion per 100 parts of material has been found necessary. They may be applied to a textile or paper by any conventional means such as by padding or by exhaustion from a bath or by spraying techniques.

The following examples are illustrative of the invention.

EXAMPLE 1

Into 1080 parts of stearic acid melted to 100° C. there was added 210 parts of diethylene triamine. The solution was heated to 185° C. in a flask fitted with a stirrer, Dean and Stark trap and condenser and reacted for a period of about 3 hours until 75 parts of water were removed. The solution was then cooled to 110° C. and placed in an enamel pan. 1202 parts of diethylene triamine disteramide were obtained.

EXAMPLE 2

304 parts of the disteramide were melted under a nitrogen atmosphere at 115° C. in a flask fitted with a stirrer and condenser. 117 parts of 98% formic acid were added over a period of about 20 minutes. The mixture was cooled to about 70° C. and 37 parts of powdered 91% formaldehyde were added. The reaction mixture was stirred at 70° C. for a period of about two hours and then heated to 110° C. for an additional two hours. 100 parts of toluene were added and residual water and formic acid azeotroped off. 50% sodium hydroxide was added in an amount sufficient for the mixture to produce an alkaline reaction to indicator paper. An additional 80 parts of toluene were added and the mixture was heated to 100° C. and filtered. The filtrate was stripped of toluene up to 130° C. (water aspirator vacuum) and the residue panned to obtain 275 parts of N-methyl diethylene triamine disteramide.

EXAMPLE 3

152 parts of the product of Example 1 were treated with 59 parts of 98% formic acid and 19 parts of powdered 91% paraformaldehyde and treated essentially in the same manner outlined in Example 2.

EXAMPLE 4

304 parts of a product made as outlined in Example 1 were reacted with 59 parts of 98% formic acid and 19 parts of 91% paraformaldehyde for a period of about 13 hours at a temperature of about 70 to 100° C. 279 parts of N-methyl diethylene triamine disteramide were recovered after isolation according to essentially the same method outlined in Example 2. As an alternative to the isolation procedure, the reaction product was made alkaline with caustic soda (300 parts water: 50 parts salt) and decanted at 100° C. while still liquid. The amine formed was then freed from residual moisture by drying at 140° C. As yet another alternative after the above reaction, the mixture was heated to 160° C. for an hour under water aspirator vacuum, cooled to 110° C. and panned.

EXAMPLE 5

93.2 parts of the product made according to Example 2 were heated while stirring to 110° C. 18.9 parts of dimethyl sulfate were added over a period of about an hour and the reaction product held for about a second hour at 120° C. The product was discharged into 336 parts of water at a temperature of 90° C. with stirring. The mass was cooled with mixing to room temperature to obtain a firm, pourable, tan-colored paste of distearamidoethyl dimethyl ammonium methosulfate.

EXAMPLE 6

The product made according to Example 2 was heated essentially as outlined in Example 5 but instead of dimethyl sulfate, polyethylene glycol 210 chloride was employed.

EXAMPLE 7

The product made according to Example 2 was treated essentially as outlined in Example 5 but instead of dimethyl sulfate, diethyl sulfate was employed. After producing the paste as described, it was diluted to a 3.4% solids fluid dispersion of distearamidoethyl methyl ethyl ammonium ethosulfate.

EXAMPLE 8

The product made according to Example 2 was treated essentially as outlined in Example 5 except that dodecyl benzyl chloride was used instead of dimethyl sulfate to produce distearamidoethyl methyl dodecylbenzyl ammonium chloride.

EXAMPLE 9

The product made according to Example 2 again treated essentially as described in Example 5 but instead of dimethyl sulfate, isobutyric acid was employed to produce the isobutyric acid salt of distearamidoethyl methyl amine.

EXAMPLE 10

The product of Example 7 was applied to a 80 x 80 strip of bleached cotton in an amount sufficient to impregnate the fabric with 0.5 weight percent of distearamidoethyl methyl ethyl ammonium ethosulfate. The fabric was softer than an untreated cotton strip.

EXAMPLE 11

The product made according to Example 2 was again treated essentially as described in Example 5 but instead of dimethyl sulfate, acetic acid was employed to produce the acetate salt of distearamidoethyl methyl amine. 0.75 weight percent of this product together with 5 weight percent of a commercial dimethylol ethylene urea resin and zinc nitrate catalyst were applied by padding to an 80 x 80 strip of cotton. The fabric was cured at 300° F. for 5 minutes and was softer than a strip prepared essentially in the same manner but without the acetate salt of distearamidoethyl methyl amine.

EXAMPLE 12

To a product made essentially according to Example 5 there was added water in sufficient amounts to produce a fluid dispersion containing about 3 weight percent distearamidoethyl dimethyl ammonium methosulfate. A strip of terry toweling was treated with the dispersion by agitation for several minutes and subsequently dried. The toweling was softer than an untreated strip of the same material.

EXAMPLE 13

The procedure of Example 1 was repeated except that instead of stearic acid, 1128 parts of freshly distilled oleic acid were employed to produce diethylene triamine reacted with formic acid and paraformaldehyde in essentially the same manner as outlined in Example 2 to produce dioleylamidoethyl methyl amine which was subsequently reacted in a manner essentially the same as that outlined in Example 5 to produce dioleylamidoethyl dimethyl ammonium methosulfate.

EXAMPLE 14

A dioleylamidoethyl methyl amine was prepared essentially according to the method described above in Example 13. This product was then reacted with acetic acid according to the scheme outlined in Example 9 to produce the acetate salt of dioleylamidoethyl methyl amine. This product was then admixed with water in amounts sufficient to obtain a firm pourable paste.

EXAMPLE 15

The method of Example 13 was repeated and the dioleylamidoethyl dimethyl ammonium methosulfate produced was added to a stock slurry of wood fiber in amounts such that the finished sheet had about 0.5 weight percent methosulfate incorporated therein. This sheet was softer and more pliable than a similar sheet fabricated without the incorporation of the quaternary salt.

EXAMPLE 16

The procedure of Example 1 was repeated except that instead of stearic acid, 1136 parts of distilled tall oil fatty acids were employed to produce the diethylene triamine diamide of tall oil fatty acids. This product was similarly reacted with formic acid and formaldehyde as outlined in Example 2 to produce N-methyl diethylene triamine diamides of tall oil fatty acids. To 93.2 parts of this product were added 9 parts of glacial acetic acid at a temperature of about 105° C. After thorough mixing for 5 to 10 minutes the acetate salt of N'-methyl diethylene triamine diamide of tall fatty acids was added to 306 parts of water at 90° C. and the paste worked up as shown in Example 5.

EXAMPLE 17

An N'-methyl diethylene triamine diamide of tall oil fatty acids was prepared essentially in the same manner described above in Example 16. This product was then reacted with dimethyl sulfate to produce the quaternary salt.

EXAMPLE 18

Example 16 was repeated and the acetate salt of N'-methyl diethylene triamine diamide of tall oil fatty acids produced was added to a stock slurry of wood fiber such that the finished sheet had about 0.5 weight percent acetate salt incorporated therein. This sheet was softer and more pliable than a similar sheet fabricated without the incorporation of the acetate salt.

EXAMPLE 19

The procedure of Example 1 was repeated except that instead of stearic acid, caprylic acid was employed to produce diethylene triamine dicaprylamide. This product was similarly reacted with formic acid and formaldehyde as outlined in Example 2 to produce dicaprylamidoethyl methyl amine which was subsequently reacted with diethyl sulfate or produce dicaprylamidoethyl methyl ethyl ammonium ethosulfate.

EXAMPLE 20

Into 540 parts of stearic acid melted to 100° C. there was added 215 parts of bis-hexamethylene triamine. The solution was heated to 185° C. in a flask fitted with a stirrer, Dean and Stark trap and condenser and held for four hours until 34 parts of water were removed. After cooling and discharging the reaction product into an enamel pan there was collected bis-hexamethylene triamine distearamide, 360 parts of which were treated with 59 parts of 98% formic acid and 19 parts of 91% paraformaldehyde over an eight hour period at a temperature range of about 70–100° C. The resulting product was then reacted with 63 parts of dimethyl sulfate at about 130° C. for an hour to yield distearamidohexyl dimethyl ammonium methosulfate.

Various modifications may be made in the invention described herein without deviating from the scope thereof as set forth in the following claims wherein—

What is claimed is:

1. A cellulosic fiber impregnated with a compound having the formula

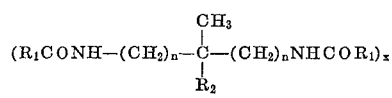

wherein $R_1CO$ is a fatty acid radical containing at least 8 carbon atoms, $R_2$ is selected from the group consisting of hydrogen, lower alkyl, polyalkylene glycols, benzyl, phenyl and benzyl and phenyl substituted with an alkyl radical having 1–12 carbon atoms, $x$ is selected from the group consisting of lower alkyl sulfate, chloride and lower alkyl monocarboxylic acid radicals and $n$ is 2–6, the amount of said compound being sufficient to improve the softness of said fiber.

2. A cellulosic fiber according to claim 1 wherein $x$ is chloride.

3. A cellulosic fiber according to claim 1 wherein said compound is distearamidoethyl dimethyl ammonium methosulfate.

4. A cellulosic fiber according to claim 1 wherein said compound is acetate salt of N-methyl diethylene triamine of tall oil fatty acids.

5. A cellulosic fiber according to claim 1 wherein said compound is methosulfate of N'-methyldiethylene triamine diamide of tall oil fatty acids.

6. A cellulosic fiber according to claim 1 wherein said compound is dioleylamidoethyl dimethyl ammonium methosulfate.

7. A cellulosic fiber according to claim 1 wherein said compound is distearamidoethyl methyl ethyl ammonium ethosulfate.

8. A cellulosic fiber according to claim 1 wherein said compound is dicaprylamidoethyl methyl ethyl ammonium ethosulfate.

9. A cellulosic fiber according to claim 1 wherein said compound is distearamidoethyl methyl dodecylbenzyl ammonium chloride.

10. A cellulosic fiber according to claim 1 wherein said compound is distearamidoethyl methyl ammonium isobutyrate.

11. A cellulosic fiber according to claim 1 wherein said compound is distearamidohexyl dimethyl ammonium methosulfate.

References Cited

UNITED STATES PATENTS

| | | | |
|---|---|---|---|
| 2,459,062 | 1/1949 | Cook et al. | 260—404.5 |
| 2,583,772 | 1/1952 | Gunderson | 260—401 |
| 3,074,815 | 1/1963 | Lee et al. | 260—404.5 |

WILLIAM D. MARTIN, Primary Examiner

T. G. DAVIS, Assistant Examiner

U.S. Cl. X.R.

117—143; 252—8.75, 8.8